US009000701B2

(12) United States Patent  
Schulz et al.

(10) Patent No.: US 9,000,701 B2  
(45) Date of Patent: Apr. 7, 2015

(54) METHODS, SYSTEMS AND APPARATUS FOR GENERATING VOLTAGE COMMANDS USED TO CONTROL OPERATION OF A PERMANENT MAGNET MACHINE

(71) Applicant: GM Global Technology Operations LLC, Detroit, MI (US)

(72) Inventors: Steven E. Schulz, Torrance, CA (US); Bon Ho Bae, Torrance, CA (US); Konstantin S. Majarov, Torrance, CA (US); Yo Chan Son, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

(21) Appl. No.: 13/693,953

(22) Filed: Dec. 4, 2012

(65) Prior Publication Data

US 2013/0169202 A1 Jul. 4, 2013

Related U.S. Application Data

(60) Provisional application No. 61/582,044, filed on Dec. 30, 2011.

(51) Int. Cl.
*H02K 29/06* (2006.01)
*H02P 6/10* (2006.01)
(Continued)

(52) U.S. Cl.
CPC .......... *H02P 21/0032* (2013.01); *B60L 15/025* (2013.01); *H02P 21/0021* (2013.01); *Y02T 10/643* (2013.01)

(58) Field of Classification Search
None
See application file for complete search history.

(56) References Cited

U.S. PATENT DOCUMENTS 5,089,760 A * 2/1992 Joyner, Jr. ............ 318/798
5,717,305 A * 2/1998 Seibel et al. ............ 318/778

(Continued)

FOREIGN PATENT DOCUMENTS

CN 101174812 A 5/2008
CN 101267184 A 9/2008

(Continued)

OTHER PUBLICATIONS

State Intellectual Property Office of the Peoples' Republic of China, Office Action in Chinese Patent Application No. 201210582202.2, mailed Oct. 8, 2014.

(Continued)

*Primary Examiner* — Paul Ip
*Assistant Examiner* — Devon Joseph
(74) *Attorney, Agent, or Firm* — Ingrassia Fisher & Lorenz, P.C.

(57) ABSTRACT

Methods, systems and apparatus are provided for generating voltage commands used to control operation of a permanent magnet machine. For example, a control system is provided that generates voltage command signals for controlling a permanent magnet machine during a transition from an initial operating condition to a final operating condition. The control system includes a processor configured to execute software instructions, and a memory configured to store software instructions accessible by the processor. The software instructions comprise a voltage command generator module. Based on an electrical angular frequency of the permanent magnet machine, and synchronous reference frame current signals, the voltage command generator module is configured to generate ramped voltage command signals that each change linearly in accordance with a slope during a transition period that is set to a rise time.

19 Claims, 10 Drawing Sheets

(51) Int. Cl.
*H02P 3/18* (2006.01)
*G01R 27/26* (2006.01)
*H02P 21/00* (2006.01)
*B60L 15/02* (2006.01)

(56) References Cited

U.S. PATENT DOCUMENTS

| | | | |
|---|---|---|---|
| 5,923,144 A * | 7/1999 | Seibel et al. | 318/805 |
| 2004/0249596 A1 * | 12/2004 | Ho | 702/106 |
| 2007/0024232 A1 * | 2/2007 | Suzuki et al. | 318/812 |
| 2010/0066283 A1 * | 3/2010 | Kitanaka | 318/400.02 |
| 2010/0098553 A1 | 4/2010 | Smith | |
| 2011/0050141 A1 * | 3/2011 | Yeh et al. | 318/434 |
| 2012/0098472 A1 * | 4/2012 | Wrobel et al. | 318/400.11 |
| 2012/0098553 A1 * | 4/2012 | Karlsson et al. | 324/684 |
| 2013/0043814 A1 * | 2/2013 | Chuah et al. | 318/400.04 |
| 2013/0169206 A1 * | 7/2013 | Suhama et al. | 318/400.24 |
| 2013/0221885 A1 * | 8/2013 | Hunter | 318/400.15 |
| 2014/0018991 A1 * | 1/2014 | Yamada | 701/22 |

FOREIGN PATENT DOCUMENTS

| | | |
|---|---|---|
| CN | 101529714 A | 9/2009 |
| DE | 10300953 A1 | 7/2004 |
| DE | 102004049157 A1 | 6/2005 |
| WO | 2010149234 A1 | 12/2010 |

OTHER PUBLICATIONS

German Patent and Trade Mark Office, Office Action for German Patent Application No. 10 2012 223 227.3, mailed Dec. 19, 2014.

* cited by examiner

METHODS, SYSTEMS AND APPARATUS FOR GENERATING VOLTAGE COMMANDS USED TO CONTROL OPERATION OF A PERMANENT MAGNET MACHINE

CROSS REFERENCE TO RELATED APPLICATIONS

This application claims the benefit of U.S. Provisional Application No. 61/582,044, filed Dec. 30, 2011.

TECHNICAL FIELD

The technical field generally relates to techniques for controlling the operation of multi-phase systems, and more particularly relates to methods, systems and apparatus for generating voltage commands used to control a permanent magnet machine.

BACKGROUND

Electric machines are utilized in a wide variety of applications. For example, hybrid/electric vehicles (HEVs) typically include an electric traction drive system that includes an alternating current (AC) electric machine that is driven by a power converter with a direct current (DC) power source, such as a storage battery. Machine windings of the AC electric machine can be coupled to inverter sub-modules of a power inverter module (PIM). Each inverter sub-module includes a pair of switches that switch in a complementary manner to perform a rapid switching function to convert the DC power to AC power. This AC power drives the AC electric machine, which in turn drives a shaft of the HEV's drivetrain.

As used herein, the term "multi-phase" refers to two or more phases, and can be used to refer to electric machines that have two or more phases. A multi-phase electric machine typically includes a multi-phase pulse width modulated (PWM) inverter module that drives one or more multi-phase AC machine(s). One example of such a multi-phase electric machine is a three-phase permanent magnet AC machine. In a three-phase system, a three-phase PWM inverter module drives one or more three-phase permanent magnet AC machine(s). For example, some traditional HEVs implement two three-phase PWM inverter modules and two three-phase permanent magnet AC machines each being driven by a corresponding one of the three-phase PWM inverter modules that it is coupled to.

In many conventional motor drive systems, the inverter modules are driven by switching vector signals that are generated based on voltage command signals. For example, in a conventional motor drive system that relies on closed loop current control techniques, these voltage command signals can be generated based on feedback or measured stator currents and current commands that are processed by a current regulator.

One drawback associated with machine drive systems that are used to drive permanent magnet machines is that when they undergo an abrupt change from one operating point to another, large transient currents can be introduced. For example, when transitioning from some initial condition to three-phase short abruptly, a large transient current is introduced. The transient current amplitude can easily equal or even exceed two times the motor characteristic current. The transient current presents significant stress to both the motor and inverter. Additionally, the transient current often peaks close to the negative d-axis of the machine. The negative d-axis current tends to oppose the permanent magnet flux. If the current is sufficiently large, it can result in demagnetization of the rotor magnets.

One of the highest performing magnets being used today is the rare earth NeFeB type. Several additives are used to enhance the properties of the magnet. One of these is Dysprosium, which increases coercivity and enhances the robustness of the magnet to demagnetization. Unfortunately, Dysprosium is very expensive. If the large transient negative d-axis current can be eliminated, then it is possible to reduce the Dysprosium content and use lower grade magnets without fear of demagnetization. Thus, the machine cost can be significantly reduced.

Other machine designs employ ferrite type magnets which are lower cost. However, these magnets are also particularly susceptible to demagnetization. It would be desirable to reduce or eliminate the threat of demagnetization by reducing the large transient negative d-axis current since doing so would allow for lower cost designs to be employed.

Finally, regardless of magnet type, in any permanent magnet machine design, the peak negative d-axis current is considered as a design constraint. The designer must optimize the rotor geometry to avoid demagnetization of the magnet under the expected peak negative d-axis current. If the peak current amplitude can be reduced, then this eases the design constraints due to demagnetization concerns, possibly allowing for improved torque density and/or efficiency.

It would be desirable to provide improved methods, systems and apparatus for generating voltage commands used to control a multi-phase permanent magnet machine. Other desirable features and characteristics of the present invention will become apparent from the subsequent detailed description and the appended claims, taken in conjunction with the accompanying drawings and the foregoing technical field and background.

SUMMARY

Embodiments of the present disclosure relate to methods, systems and apparatus for controlling operation of a permanent magnet machine in a machine drive system.

In accordance with one of the disclosed embodiments, a control system is provided that generates voltage command signals for controlling a permanent magnet machine during a transition from an initial operating condition to a final operating condition. The control system includes a processor configured to execute software instructions, and a memory configured to store software instructions accessible by the processor. The software instructions comprise a voltage command generator module. Based on an electrical angular frequency of the permanent magnet machine, and synchronous reference frame current signals, the voltage command generator module is configured to generate ramped voltage command signals that each change linearly in accordance with a slope during a transition period that is set to a rise time.

DESCRIPTION OF THE DRAWINGS

Embodiments of the present disclosure will hereinafter be described in conjunction with the following drawing figures, wherein like numerals denote like elements.

DETAILED DESCRIPTION

Figure 1:
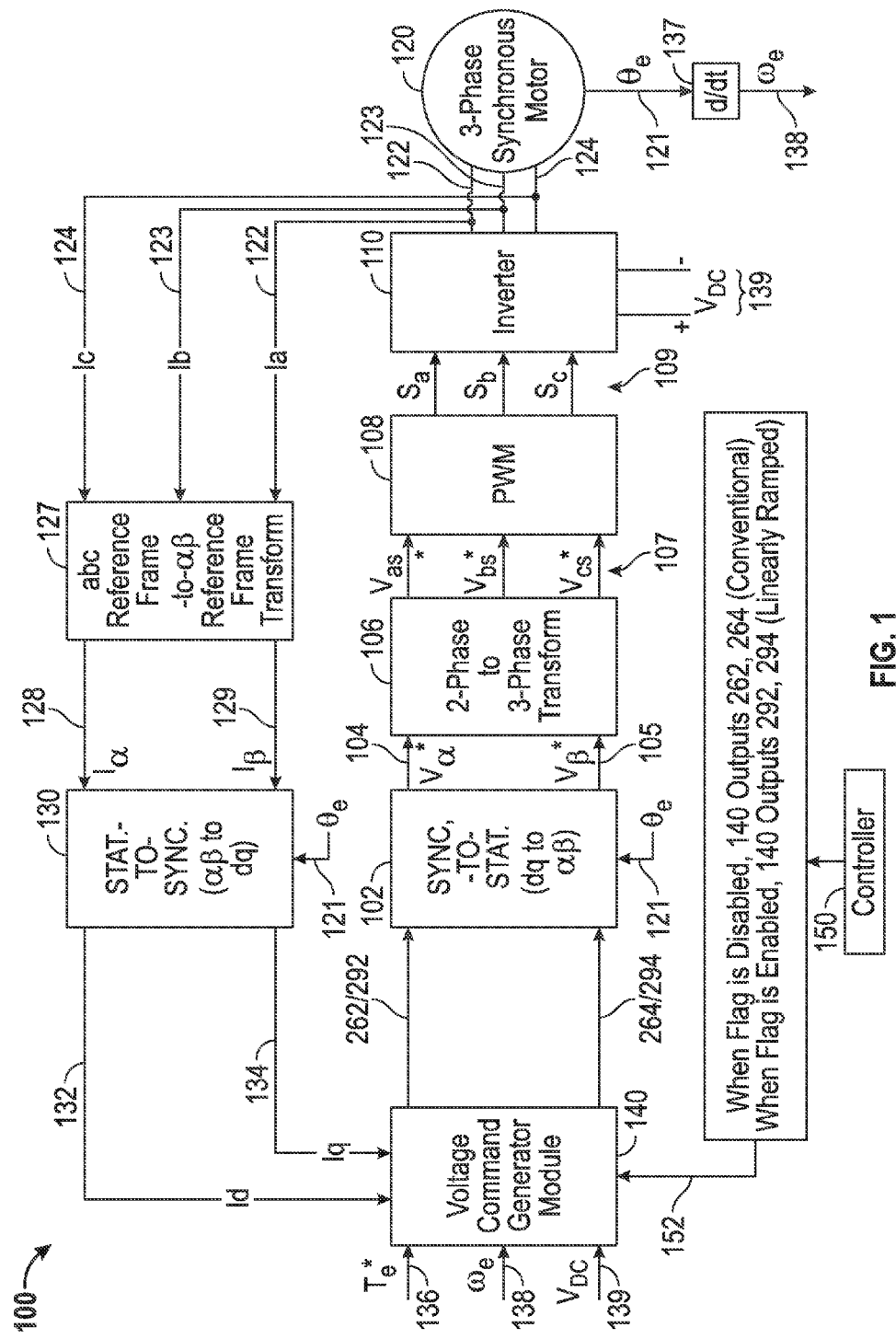
FIG. 1 is a block diagram of one example of a machine drive system in accordance with some of the disclosed embodiments.

As used herein, the word "exemplary" means "serving as an example, instance, or illustration." The following detailed description is merely exemplary in nature and is not intended to limit the disclosure or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the disclosure and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to generating voltage commands used for controlling operation of a multi-phase system. It will be appreciated that embodiments of the disclosure described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the disclosure described herein may be comprised of one or more conventional processors and unique stored program instructions that control the one or more processors to implement, in conjunction with certain non-processor circuits, some, most, or all of the functions for generating voltage commands used for controlling operation of a multi-phase system, as described herein. As such, these functions may be interpreted as steps of a method for generating voltage commands used for controlling operation of a multi-phase system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present disclosure relate to methods, systems and apparatus for generating voltage commands used for controlling operation of a multi-phase system that includes a multi-phase permanent magnet machine. In one exemplary implementation which will now be described, the multi-phase permanent magnet machine can be implemented in operating environments such as a hybrid/electric vehicle (HEV), and control techniques and technologies will be described as applied to a HEV. However, it will be appreciated by those skilled in the art that the same or similar techniques and technologies can be applied in the context of other systems in which it is desirable to generate voltage commands used for controlling operation of a multi-phase permanent magnet machine. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to "a device or apparatus that converts electrical energy to mechanical energy or vice versa." Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC machine is an electric machine that is driven by an alternating current. In some implementations, an AC machine includes an outside stationary stator having coils supplied with alternating current to produce a rotating magnetic field, and an inside rotor attached to the output shaft that is given a torque by the rotating field. Depending on the type of rotor used, AC machines can generally be classified as being synchronous AC machines or asynchronous AC machines. Synchronous AC machines can include permanent magnet machines and reluctance machines. Permanent magnet machines include surface mount permanent magnet machines (SMPMMs) and interior permanent magnet machines (IPMMs). By contrast, asynchronous AC machines include induction machines. In this application, embodiments are described in which the machine is a synchronous machine.

FIG. 1 is a block diagram of one example of a motor drive system 100 in accordance with the disclosed embodiments. The system 100 controls a three-phase AC machine 120 via a three-phase pulse width modulated (PWM) inverter module 110 coupled to the three-phase AC machine 120 so that the three-phase AC machine 120 can efficiently use a DC input voltage (Vdc) 139 provided to the three-phase PWM inverter module 110 by adjusting current and voltage commands that control the three-phase AC machine 120. In one particular implementation, the motor drive system 100 can be used to control torque in an HEV.

In the following description of one particular non-limiting implementation, the three-phase AC machine 120 is embodied as a three-phase AC powered motor 120, and in particular a three-phase, permanent magnet synchronous AC powered motor (or more broadly as a motor 120); however, it should be appreciated that the illustrated embodiment is only one non-limiting example of the types of AC machines that the disclosed embodiments can be applied to, and further that the disclosed embodiments can be applied to any type of synchronous multi-phase AC machine that includes fewer or more phases.

The three-phase AC motor 120 is coupled to the three-phase PWM inverter module 110 via three inverter poles and generates mechanical power (Torque×Speed) based on three-phase stationary reference frame feedback stator currents (Ia . . . Ic) 122-124 received from the PWM inverter module 110. In some implementations, the electrical angular position (θe) 121 of the three-phase AC motor 120 or "shaft position" is measured using a position sensor (not illustrated), and in other implementations, the electrical angular position (θe) 121 of the three-phase AC motor 120 can be estimated without using a position sensor by using sensorless position estimation techniques.

The motor drive system 100 also includes a voltage command generator module 140, a synchronous-to-stationary transformation module 102, an αβ reference frame-to-abc reference frame (αβ-to-abc) transformation module 106, a pulse width modulation (PWM) module 108, a three-phase PWM inverter 110, an abc reference frame-to-αβ reference frame (abc-to-αβ) transformation module 127, and a stationary-to-synchronous (STAT.-TO-SYNC.) transformation module 130.

The controller 150 generates and controls the status of a flag 152. When the flag 152 is disabled, this indicates that the voltage command generator module 140 is to operate in standard voltage command generation mode, which means that the voltage command generator module 140 will output standard synchronous reference frame voltage command signals (Vd*, Vq*) 262, 264 as its output signals. By contrast, when the flag 152 is enabled, this indicates that the voltage command generator module 140 is to operate in ramped voltage command generation mode, which means that the voltage command generator module 140 will output ramped voltage command signals (Vd, Vq) 292, 294 as its output signals.

The voltage command generator module 140 receives a torque command signal (Te*) 136, an electrical angular frequency ($\omega_e$) 138 that is generated at block 137 based on the derivative of the electrical angular position (θe) 121, the DC input voltage ($V_{DC}$) 139, a synchronous reference frame d-axis current signal (Id) 132 and a synchronous reference frame q-axis current signal (Iq) 134 as inputs, along with possibly a variety of other system parameters depending upon implementation. As will be explained in greater detail below with reference to FIGS. 2 and 3, depending on the status of the flag 152, the voltage command generator module 140 uses these inputs to generate either (1) standard voltage command signals (Vd*, Vq*) 262, 264, or (2) ramped voltage command signals (Vd, Vq) 292, 294.

The abc-to-αβ transformation module 127 receives the three-phase stationary reference frame feedback stator currents (Ia . . . Ic) 122-124 and uses them to perform an abc reference frame-to-αβ reference frame transformation to transform the three-phase stationary reference frame feedback stator currents 122-124 into stationary reference frame feedback stator currents (Iα, Iβ) 128, 129. The abc-to-αβ transformation is well-known in the art and for sake of brevity will not be described in detail.

The stationary-to-synchronous transformation module 130 receives the stationary reference frame feedback stator currents (Iα, Iβ) 128, 129 and the electrical angular position (θe) 121 and generates (e.g., processes or converts) these stationary reference frame feedback stator currents (Iα, Iβ) 128, 129 to generate the synchronous reference frame d-axis current signal (Id) 132 and the synchronous reference frame q-axis current signal (Iq) 134. The process of stationary-to-synchronous conversion is well-known in the art and for sake of brevity will not be described in detail.

The synchronous-to-stationary transformation module 102 receives either the (1) the standard voltage command signals (Vd*, Vq*) 262, 264, or (2) the ramped voltage command signals (Vd, Vq) 292, 294, as inputs along with the electrical angular position (θe) 121, and can use these inputs to perform a dq-to-αβ transformation to generate an α-axis stationary reference frame voltage command signal (Vα*) 104 and a β-axis stationary reference frame voltage command signal (Vβ*) 105. The stationary reference frame α-axis and β-axis voltage command signals (Vα*, Vβ*) 104, 105 are in the stationary reference frame and therefore have values that vary as a sine wave as a function of time. The process of synchronous-to-stationary conversion is well-known in the art and for sake of brevity will not be described in detail.

Referring still to FIG. 1, the αβ-to-abc transformation module 106 receives the stationary reference frame voltage command signals (Vα*, Vβ*) 104, 105, and based on these signals, generates stationary reference frame voltage command signals (Vas* . . . Vcs*) 107 (also referred to as "phase voltage command signals") that are sent to the PWM module 108. The αβ-to-abc transformation is well-known in the art and for sake of brevity will not be described in detail.

The three-phase PWM inverter module 110 is coupled to the PWM module 108. The PWM module 108 is used for the control of pulse width modulation (PWM) of the phase voltage command signals (Vas* . . . Vcs*) 107. The switching vector signals (Sa . . . Sc) 109 control the switching states of switches in PWM inverter 110 to generate three-phase voltage commands at each phase A, B, C. The switching vector signals (Sa . . . Sc) 109 are PWM waveforms that have a particular duty cycle (during each PWM period) that is determined by the duty cycle waveforms that are internally generated at the PWM module 108. In other words, the switching vector signals (Sa . . . Sc) 109 are generated based on duty cycle waveforms that are internally generated at the PWM module 108 to have a particular duty cycle during each PWM period. The PWM module 108 modifies the phase voltage command signals (Vas* . . . Vcs*) 107 based on the duty cycle waveforms (not illustrated in FIG. 1) to generate switching vector signals (Sa . . . Sc) 109, which it provides to the three-phase PWM inverter module 110. The particular modulation algorithm implemented in the PWM module 108 can be any known modulation algorithm including Space Vector Pulse Width Modulation (SVPWM) techniques to control of pulse width modulation (PWM) to create alternating current (AC) waveforms that drive the machine 120 at varying speeds based on the DC input 139.

The three-phase PWM inverter module 110 receives the DC input voltage (Vdc) and switching vector signals (Sa . . . Sc) 109, and uses them to generate three-phase alternating current (AC) voltage signal waveforms at inverter poles that drive the three-phase AC machine 120 at varying speeds ($\omega r$).

The three-phase machine 120 receives the three-phase voltage signals generated by the PWM inverter 110 and generates a motor output at the commanded torque Te* 136. In one particular implementation, the machine 120 comprises a three-phase synchronous machine 120, but the disclosed embodiments can be applied to any synchronous machine having any number of phases.

Although not illustrated in FIG. 1, the system 100 may also include a gear coupled to and driven by a shaft of the three-phase AC machine 120. The measured feedback stator currents (Ia-Ic) 122-124 are sensed, sampled and provided to the abc-to-$\alpha\beta$ transformation module 127 as described above.

Figure 2A:
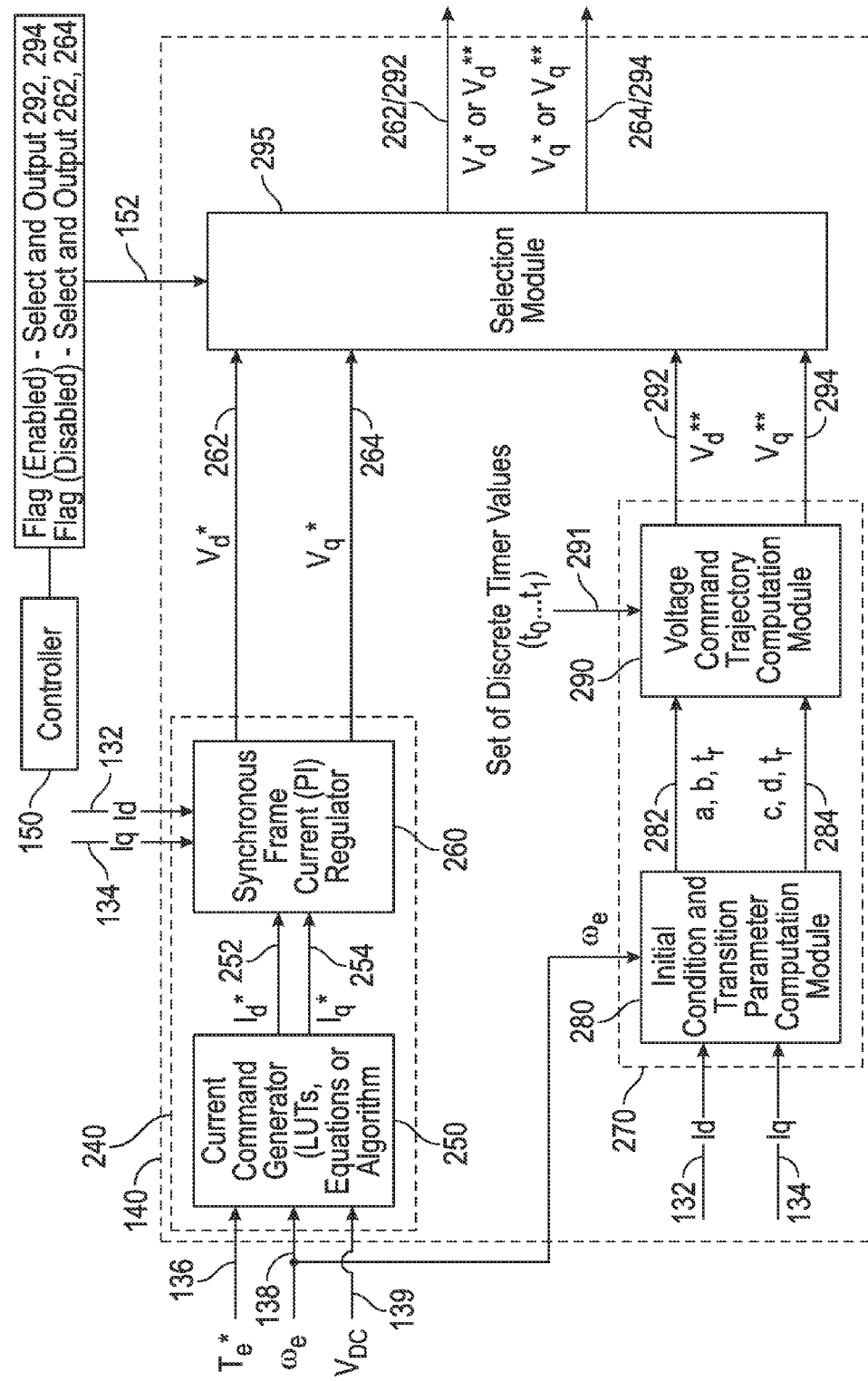
FIG. 2A is a block diagram that illustrates a voltage command generator module in accordance with one exemplary implementation of some of the disclosed embodiments.

FIG. 2A is a block diagram that illustrates a voltage command generator module 140 in accordance with one exemplary implementation of some of the disclosed embodiments.

The voltage command generator module 140 includes a standard voltage command generator module 240, a ramped voltage command generator module 270, and a selection module 295 for selecting between the outputs generated by the standard voltage command generator module 240 and the ramped voltage command generator module 270.

The standard voltage command generator module 240 includes a current command generator module 250 and a synchronous (SYNC.) frame current regulator module 260.

The current command generator module 250 receives a torque command signal (Te*) 136, the electrical angular frequency ($\omega_e$) 138 that is generated at block 137, and the DC input voltage ($V_{DC}$) 139 as inputs, along with possibly a variety of other system parameters depending upon implementation. The current command generator module 250 uses these inputs to generate a d-axis current command (Id*) 252 and a q-axis current command (Iq*) 254 that will ideally cause the machine 120 to generate the commanded torque (Te*) at electrical angular frequency ($\omega_e$) 138. The current command generator module 250 can be implemented using any equations, lookup tables or algorithms that are known in the art to map the inputs to a d-axis current command signal (Id*) 252 and a q-axis current command signal (Iq*) 254. The synchronous reference frame d-axis and q-axis current command signals (Id*, Iq*) 252, 254 are DC commands that have a constant value as a function of time at steady state.

The synchronous frame current regulator module 260 receives the synchronous reference frame d-axis current signal (Id) 132, the synchronous reference frame q-axis current signal (Iq) 134, the d-axis current command (Id*) 252 and the q-axis current command (Iq*) 254, and uses these signals to generate a standard synchronous reference frame d-axis voltage command signal (Vd*) 262 and a standard synchronous reference frame q-axis voltage command signal (Vq*) 264.

The standard synchronous reference frame voltage command signals (Vd*, Vq*) 262, 264 are DC commands that have a constant value as a function of time for steady state operation. Because the current commands are DC signals in the synchronous reference frame they are easier to regulate in comparison to AC stationary reference frame current commands. The process of current to voltage conversion can be implemented as a Proportional-Integral (PI) controller, which is known in the art and for sake of brevity will not be described in detail.

The ramped voltage command generator module 270 includes an initial condition and transition parameter computation module 280, and a voltage command trajectory computation module 290.

The initial condition and transition parameter computation module 280 receives the electrical angular frequency ($\omega_e$) 138, the synchronous reference frame d-axis current signal (Id) 132, and the synchronous reference frame q-axis current signal (Iq) 134, and uses these signals to generate a first set of values that comprises a first offset value (a), a first slope (b) and a rise time ($t_r$) 282, and a second set of values that comprises a second offset value (c), a second slope (d) and the rise time ($t_r$) 284.

In accordance with the disclosed embodiments, an optimal transition time, referred to herein as a "rise time ($t_r$)," is computed to help reduce overshoot and improve responsiveness. The initial condition and transition parameter computation module 280 can compute the rise time ($t_r$) 284 to be equal to either (1) a fundamental electrical period ($T_e$), which is the inverse of the electrical angular frequency ($\omega_e$) 138, or (2) a maximum rise time ($t_{max}$) if the fundamental electrical period ($T_e$) is greater than the maximum rise time ($t_{rmax}$). When the electrical angular frequency ($\omega_e$) 138 is low (e.g., at or below 318 rad/sec, which corresponds to a 20 millisecond period or 50 Hertz), then the rise time ($t_r$) 284 should be clamped at the maximum rise time ($t_{rmax}$).

Figure 2B:
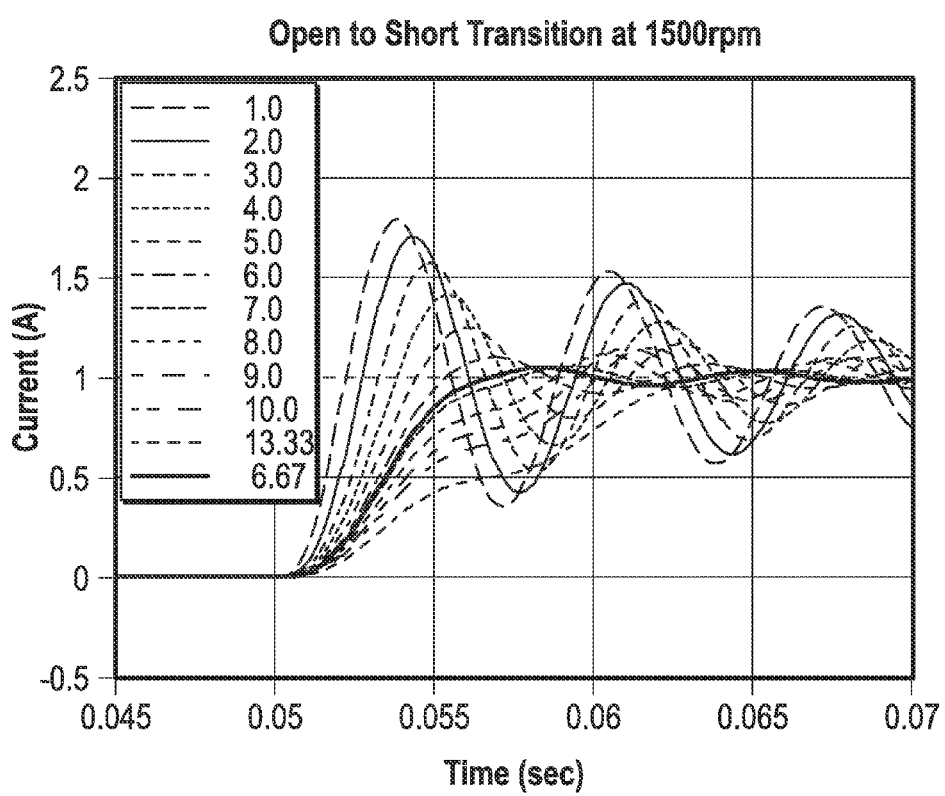
FIG. 2B is a set of simulated graphs/curves that illustrate time domain responses of a second order system, where each curve has a different rise time ($t_r$), and where one of the curves has an optimal rise time ($t_r$).

FIG. 2B is a set of simulated graphs/curves that illustrate time domain responses of a second order system to a slewed step input, where each curve has a different rise time ($t_r$). FIG. 2B illustrates that curve 200 has an optimal rise time ($t_r$) that is equal to a fundamental electrical period ($T_e$), which is 6.67 milliseconds for the system being simulated. For very fast rise times (e.g., less than or equal to 5 milliseconds in this example), there is very large overshoot, exceeding up to and above 1.75 times the steady-state value. When the rise time ($t_r$) is set to the optimal value equal to the fundamental electrical period ($T_e$), overshoot is limited to 1.05 times the steady-state value. As rise time ($t_r$) is slowed beyond the fundamental electrical period ($T_e$), the peak overshoot actually increases before dropping again near 2 times the fundamental electrical period ($T_e$). This demonstrates that increasing rise time ($t_r$) does not always result in lower peak overshoot. While the next minimum point (near 2 times the fundamental electrical period ($T_e$)) may offer slightly lower overshoot, it is not a significant reduction and not worth the increased transition time compared to the optimal value.

Figure 2C:
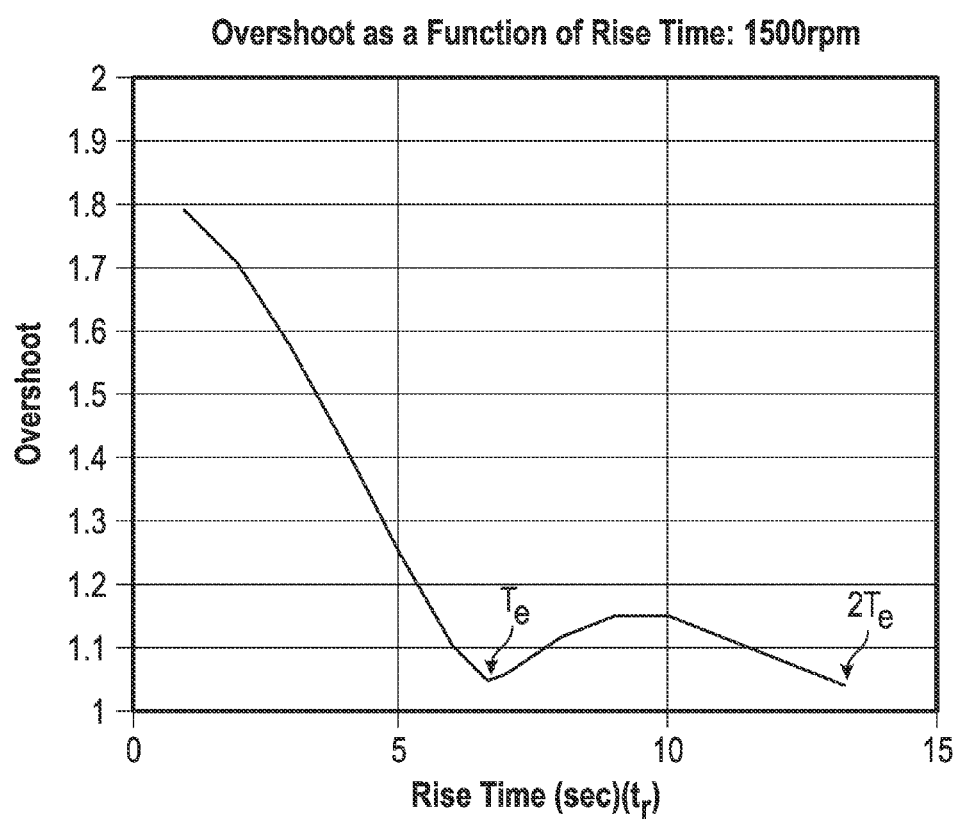
FIG. 2C is a simulated graph that plots overshoot of a second order system as a function of rise time ($t_r$).

FIG. 2C is a simulated graph that plots overshoot of a second order system as a function of rise time ($t_r$) of the slewed step input. FIG. 2C illustrates that the lowest values of overshoot occur at the fundamental electrical period ($T_e$) and multiples of the fundamental electrical period ($2T_e$), etc.

Referring again to FIG. 2A, the initial condition and transition parameter computation module 280 includes a module (not illustrated), such as a two-dimensional lookup table that generates, based on the synchronous reference frame d-axis current signal (Id) 132 and the synchronous reference frame q-axis current signal (Iq) 134, an initial value for the d-axis flux ($\lambda_{d0}$) and an initial value for the q-axis flux ($\lambda_{q0}$), and another two-dimensional lookup table that generates, based on the electrical angular frequency ($\omega_e$) 138 and the initial values for the d-axis flux ($\lambda_{d0}$) and the q-axis flux ($\lambda_{q0}$), an initial value for the d-axis voltage command signal ($Vd_0^{}$) prior to the transition, and an initial value for the q-axis voltage command signal ($Vq_0^{}$) prior to the transition. As such, based on the electrical angular frequency ($\omega_e$) 138, the synchronous reference frame d-axis current signal (Id) 132 and the synchronous reference frame q-axis current signal (Iq) 134, the initial condition and transition parameter computation module 280 can determine initial operating conditions including the initial value for the d-axis flux ($\lambda_{d0}$), the initial value for the q-axis flux ($\lambda_{q0}$), the initial value for the d-axis voltage command signal ($Vd_0^{}$) prior to the transition, and the initial value for the q-axis voltage command signal ($Vq_0^{}$) prior to the transition.

In addition, based on a desired final value of the synchronous reference frame d-axis current signal (Id), the initial condition and transition parameter computation module 280 can generate a final value for the d-axis flux ($\lambda_{df}$) and a final value of the d-axis voltage command signal ($Vd_f^{}$). Similarly, based on a desired final value of the synchronous reference frame q-axis current signal (Iq), the initial condition and transition parameter computation module 280 can generate a final value for the q-axis flux ($\lambda_{qf}$) and a final value of the q-axis voltage command signal ($Vq_f^{}$).

The initial condition and transition parameter computation module 280 can compute the first offset value (a) per equation (1) as follows:

$$a = \frac{d\lambda_d}{dt} = \frac{\lambda_{df} - \lambda_{d0}}{t_r}, \tag{1}$$

The first offset (a) is determined by the $d\lambda_d/dt$ term, which is equal to the difference between the final d-axis flux ($\lambda_{df}$) and the initial d-axis flux ($\lambda_{d0}$) divided by the rise time ($t_r$) 284.

The initial condition and transition parameter computation module 280 can compute the first slope (b) per equation (2) as follows:

$$b = \frac{Vd_f^{} - Vd_0^{}}{t_r}, \tag{2}$$

The first slope (b) is computed such that the d-axis voltage command signal (Vd) 292 will ramp from the initial value of the d-axis voltage command signal ($Vd_0^{}$) to the final value of the d-axis voltage command signal ($Vd_f^{}$) over the desired rise time ($t_r$). The first slope (b) can be computed by determining the difference between the final value of the d-axis voltage command signal ($Vd_f^{}$) and the initial value of d-axis voltage command signal ($Vd_0^{**}$) and dividing by the desired rise time ($t_r$).

The initial condition and transition parameter computation module 280 can compute the second offset value (c) per equation (3) as follows:

$$c = \frac{d\lambda_q}{dt} = \frac{\lambda_{qf} - \lambda_{q0}}{t_r}. \tag{3}$$

Thus, the second offset (c) is determined by the $d\lambda_q/dt$ term, which is equal to the difference between a final q-axis flux ($\lambda_{qf}$) and an initial q-axis flux ($\lambda_{q0}$) divided by the rise time ($t_r$) 284.

The initial condition and transition parameter computation module 280 can compute the second slope (d) per equation (4) as follows:

$$d = \frac{Vq_f^{} - Vq_0^{}}{t_r}, \tag{4}$$

The second slope (d) is computed such that the q-axis voltage command signal (Vq) 294 will ramp from the initial value of the q-axis voltage command signal ($Vq_0^{}$) to the final value of the q-axis voltage command signal ($Vq_f^{}$) over the desired rise time ($t_r$). The second slope (d) can be computed by determining the difference between the final value of the q-axis voltage command signal ($Vq_f^{}$) and the initial value of q-axis voltage command signal ($Vq_0^{**}$) and dividing by the desired rise time ($t_r$).

Referring again to FIG. 2A, the voltage command trajectory computation module 290 receives the first set of values 282, the second set of values 284, and set of discrete timer values ($t_0 \ldots t_1$) 291 as its inputs, and processes them to generate ramped voltage command signals (Vd, Vq) 292, 294. The number of the values in the set of discrete timer values ($t_0 \ldots t_1$) 291 varies depending on the rise time ($t_r$) 284, and can be generated by dividing the rise time ($t_r$) 284 into a number of discrete (e.g., evenly spaced) time increments that starts with $t_0$ and ends with $t_1$. In one embodiment, the number of discrete time increments is greater than two.

For example, based on the initial value of d-axis voltage command signal ($Vd_0^{}$), the first offset value (a), the first slope (b), the rise time ($t_r$) and the set of discrete timer values ($t_0 \ldots t_1$) 291, the voltage command trajectory computation module 290 generates the ramped synchronous reference frame d-axis voltage command signal (Vd) 292. For example, in one embodiment, the voltage command trajectory computation module 290 computes the ramped synchronous reference frame d-axis voltage command signal (Vd) 292** per equation (5) as follows:

$$Vd^{} = Vd_0^{} + a + b(t-t_0) \tag{5},$$

where the value t is the present value of a timer that varies between the initial time ($t_0$) and the rise time ($t_r$). At the start of the transition, the value of t is equal to $t_0$.

Similarly, based on the initial value of q-axis voltage command signal ($Vq_0^{}$), the second offset value (c), the second slope (d), the rise time ($t_r$) 284 and the set of discrete timer values ($t_0 \ldots t_1$) 291, the voltage command trajectory computation module 290 generates the ramped synchronous reference frame q-axis voltage command signal (Vq) 294. For example, in one embodiment, the voltage command trajectory computation module 290 computes the ramped synchronous reference frame q-axis voltage command signal (Vq) 294** per equation (6) as follows:

$$Vq^{} = Vq_0^{} + c + d(t-t_0) \tag{6}.$$

Thus, each voltage command signal will be computed using an offset and a slope such that the trajectories of the d-axis and q-axis voltage command signals (as well as the d-axis and q-axis fluxes) can be linearly ramped from the initial operating condition/point to the final operating condition/point (or target end point) over an optimal transition time referred to above as the rise time ($t_r$) (i.e., will follow straight lines toward the final operating condition/point). At the start of the transition, the value of t is equal to $t_0$.

The processing performed by the initial condition and transition parameter computation module 280 and the voltage command trajectory computation module 290 will be described in greater detail below with reference to FIG. 3.

Referring again to FIG. 2A, the selection module 295 receives the standard voltage command signals 262, 264 generated by the standard voltage command generator module 240 and the ramped voltage command signals 292, 294 generated by the ramped voltage command generator module 270. The selection module 295 selects either the standard voltage command signals 262, 264 or the ramped voltage command signals 292, 294 as its output signals.

As mentioned above, the controller 150 controls the flag 152. When the flag 152 is disabled, this indicates that the voltage command generator module 140 is to operate in standard voltage command generation mode, which means that the voltage command generator module 140 will output the standard synchronous reference frame voltage command signals (Vd*, Vq*) 262, 264 as its output signals. When the flag 152 is enabled, this indicates that the voltage command generator module 140 is to operate in ramped voltage command generation mode, which means that the voltage command generator module 140 will output the ramped voltage command signals (Vd, Vq) 292, 294 as its output signals.

In one embodiment, the selection module 295 will select the standard synchronous reference frame voltage command signals (Vd*, Vq*) 262, 264 as its output signals when a flag 152 is disabled, and will select the ramped voltage command signals (Vd, Vq) 292, 294 as its output signals when the flag 152 is enabled.

Figure 3:
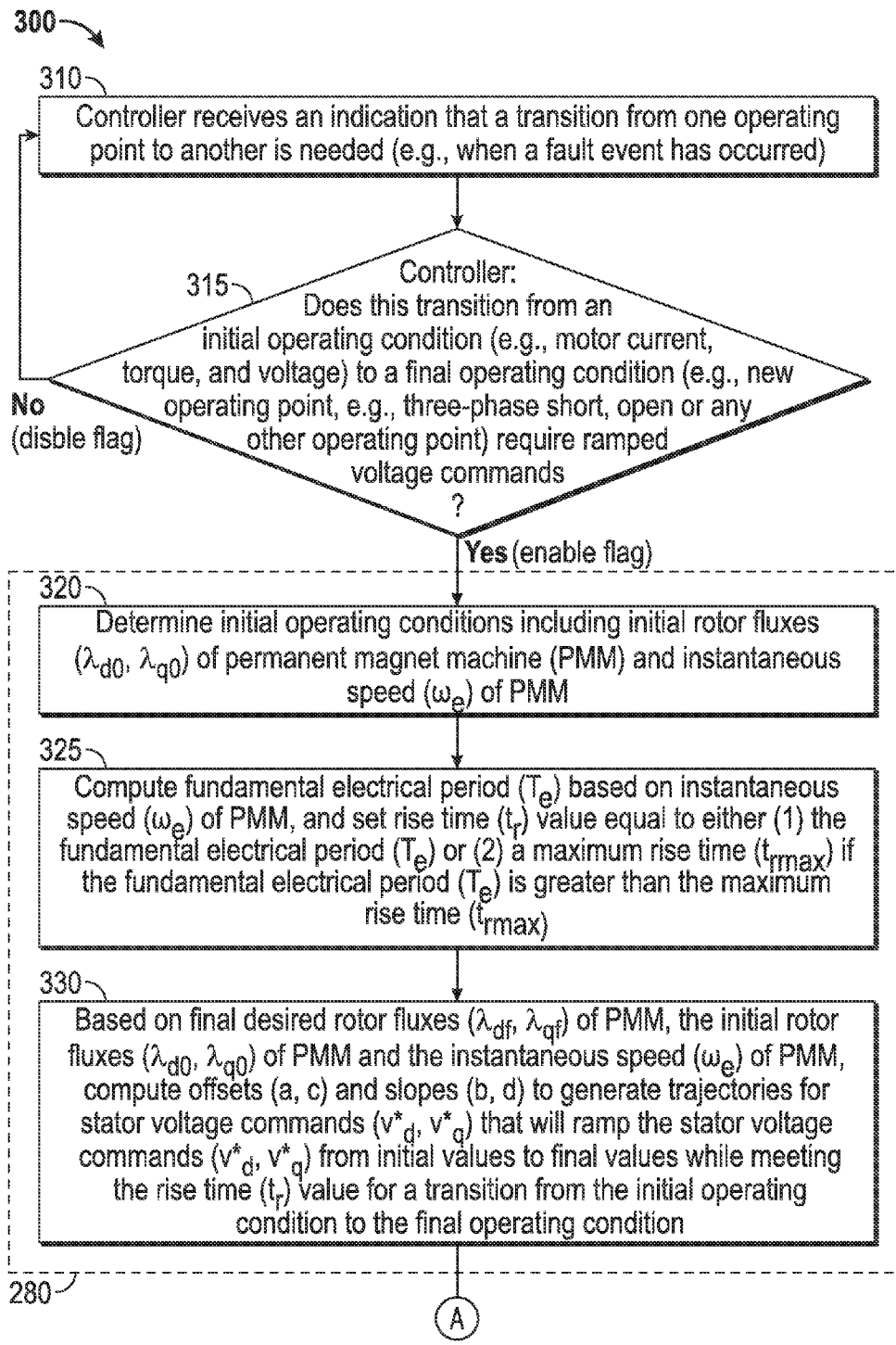
FIG. 3 is a flow chart that illustrates processing performed by a ramped voltage command generator module of FIG. 2A in accordance with one exemplary implementation of some of the disclosed embodiments.
Figure 3:
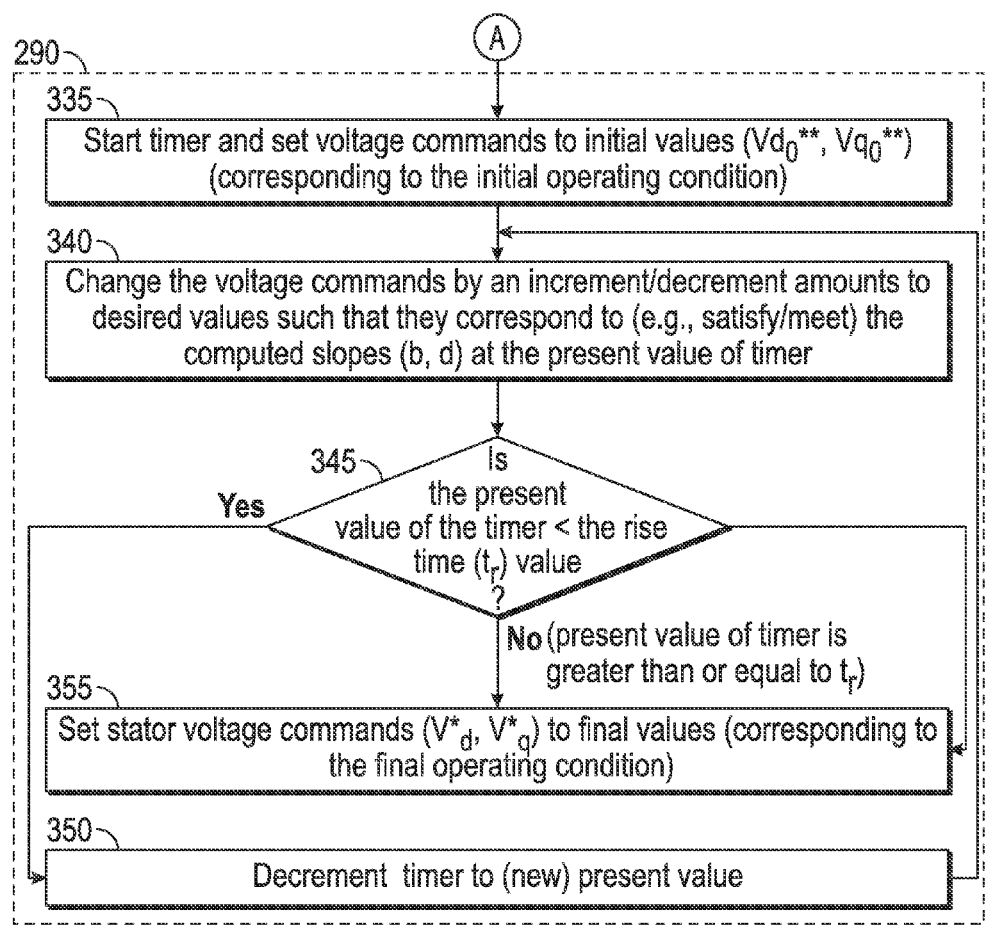

FIG. 3 is a flow chart that illustrates processing performed by the ramped voltage command generator module 270 of FIG. 2A in accordance with one exemplary implementation of some of the disclosed embodiments. FIG. 3 will be described with reference to FIGS. 1 and 2.

At 310, the controller 150 receives an indication that a transition from one operating point/condition to another is needed. As will be explained in greater detail below, in one operating scenario, this indication can be generated can be when a fault event has occurred, and a transition from one operating point to a three-phase short operating mode or a three-phase open operating mode.

At 315, the controller 150 evaluates an initial operating point/condition (e.g., motor current, torque, and voltage) associated with the transition and a final operating point/condition (e.g., any other new operating point/condition, such as a three-phase short, three-phase open, etc.) associated with the transition, and based on the evaluation, determines whether the transition requires a change from standard voltage command generation mode to ramped voltage command generation mode. In one embodiment, at 315, the controller 150 determines that the transition requires a change from standard voltage command generation mode to ramped voltage command generation mode in response to receiving a diagnostic indicator that, for example, indicates that the transition requires a change from standard voltage command generation mode to ramped voltage command generation mode.

When the controller 150 determines that the transition does not require a change from standard voltage command generation mode to ramped voltage command generation mode, the controller 150 disables the flag 152, and processing 300 loops back to 310, where the controller 150 continues to wait (at 310) for an indication that a transition from one operating point to another is needed. It is noted that while the flag 152 remains disabled, the voltage command generator module 140 continues to operate in standard voltage command generation mode, as described above.

When the controller 150 determines that the transition does require a change from standard voltage command generation mode to ramped voltage command generation mode, the controller 150 enables the flag 152, and processing 300 at the voltage command generator module 140 transitions to 320, where the voltage command generator module 140 begins to operate in ramped voltage command generation mode. It is noted that in the description that follows, blocks 320, 325, 330 describe processing that takes place at the initial condition and transition parameter computation module 280, whereas blocks 335, 340, 345, 350, 355 describe processing that takes place at the voltage command trajectory computation module 290.

At 320, the initial condition and transition parameter computation module 280 determines the initial operating conditions of the permanent magnet machine (PMM) 120 including at least the initial rotor fluxes ($\lambda_{d0}$, $\lambda_{q0}$) and instantaneous speed or electrical angular frequency ($\omega_e$) 138 of the PMM. In some embodiments, the initial operating conditions of the PMM 120 can include other variables such as input DC voltage 139.

At 325, the initial condition and transition parameter computation module 280 computes the fundamental electrical period (Te) based on electrical angular frequency ($\omega_e$) 138 of the PMM, and sets a rise time ($t_r$) 284 equal to either (1) the fundamental electrical period ($T_e$) or (2) a maximum rise time ($t_{rmax}$) if the fundamental electrical period ($T_e$) is greater than the maximum rise time ($t_{rmax}$).

At 330, based on final desired rotor fluxes ($\lambda_{df}$, $\lambda_{qf}$) of PMM, the initial rotor fluxes ($\lambda_{d0}$, $\lambda_{q0}$) of PMM and the instantaneous speed ($\omega_e$) of PMM, the initial condition and transition parameter computation module 280 computes the offsets and slopes (i.e., the first offset (a), the first slope (b), the second offset (c), and the second slope (d)) required to generate the ramped voltage command signals (Vd, Vq) 292, 294. These offsets and slopes are computed such that they will generate trajectories for voltage command signals that will "linearly" ramp the voltage command signals from initial values to final values while meeting the rise time ($t_r$) 284 for a transition from the initial operating condition to the final operating condition.

Referring again to FIG. 3, the initial condition and transition parameter computation module 280 communicates the offsets and slopes (i.e., the first offset (a), the first slope (b), the second offset (c), and the second slope (d)) along with the rise time ($t_r$) 284 to the voltage command trajectory computation module 290, and processing 300 proceeds to 335.

At 335, the voltage command trajectory computation module 290 starts a timer and sets the voltage command signals to initial values (Vd$_0$+a, Vq$_0$+c) that correspond to the initial operating condition.

At 340, the voltage command trajectory computation module 290 changes the values of the voltage commands signals, which are the initial values (Vd$_0$+a, Vq$_0$+c) during the first iteration of block 340, by an increment/decrement amounts to desired values such that they follow the trajectory of the computed slopes (b, d) at the present value of the timer, which is $t_0$ during the first iteration of block 340. In other words, the voltage command trajectory computation module 290 changes the values of the voltage commands signals such that they correspond to (e.g., satisfy/meet) the computed slopes (b, d) at the present value of timer, which is $t_0$ during the first iteration of block 340.

At 345, the voltage command trajectory computation module 290 determines whether the present value of the timer is less than the rise time ($t_r$) 284.

When the voltage command trajectory computation module 290 determines that the present value of the timer is less than the rise time ($t_r$) 284, then processing 300 proceeds to 350, where the voltage command trajectory computation module 290 changes (e.g., increments or decrements depending on the implementation) the timer to a new present value (i.e., the next value in the set of discrete timer values ($t_0 \ldots t_1$) 291), and the processing loops back to 340, where the voltage command trajectory computation module 290 once again changes the voltage commands (having the values computed during the previous iteration) by an increment/decrement amounts to new desired values such that they follow the trajectory of the computed slopes (b, d) at the present value of the timer. In other words, the voltage command trajectory computation module 290 changes the values of the voltage commands signals such that they correspond to (e.g., satisfy/meet) the computed slopes (b, d) at the new present value of timer.

By contrast, when the voltage command trajectory computation module 290 determines that the present value of the timer is greater than or equal to the rise time ($t_r$) 284, then processing 300 proceeds to 355, where the voltage command trajectory computation module 290 sets the ramped voltage command signals (Vd, Vq) 292, 294 to final values that correspond to the final operating condition.

The processing described with reference to FIGS. 2 and 3 is generic in that it can be used to generate ramped voltage command signals (Vd, Vq) 292, 294 during any transition from any initial operating condition to any different final operating condition in an optimal way without closed loop control.

To provide an example of one specific type of transition, namely a transition to a three-phase short operating mode, an example will now be described.

Example of Ramped Voltage Command Signals During a Transition from Some Initial Operating Condition to a Three-Phase Short Operating Mode During a three-phase short, all upper (or lower) switches in the inverter module are turned on simultaneously. This results in an effective three-phase short being applied to the machine. For transition to three-phase short, the desired end point is zero volts and zero flux.

However, as noted above, when transitioning from some initial condition to three-phase short abruptly, a large transient current is introduced that can cause significant stress to both the motor and inverter, and if the current is sufficiently large, it can result in demagnetization of the rotor magnets.

As will now be described, the disclosed embodiments can help prevent this abrupt transition by controlling the trajectory of voltage command signals via ramped voltage command signals (Vd, Vq).

When the transition is from some initial operating condition to a three-phase short operating mode, the initial condition and transition parameter computation module 280 can compute the first offset value (a) per equation (7) as follows:

$$a = -\frac{\lambda_{d0}}{t_r}, \tag{7}$$

where $t_r$ is the rise time ($t_r$) 284, and $\lambda_{d0}$ is an initial d-axis flux ($\lambda_{d0}$).

The initial condition and transition parameter computation module 280 can compute the first slope (b) per equation (8) as follows:

$$b = -\frac{\omega_e \lambda_{q0}}{t_r}, \tag{8}$$

where $\omega_e$ is the electrical angular frequency ($\omega_e$) 138, and $\lambda_{q0}$ is an initial q-axis flux ($\lambda_{q0}$). The initial condition and transition parameter computation module 280 can compute the second offset value (c) per equation (9) as follows:

$$c = -\frac{\lambda_{q0}}{t_r}. \tag{9}$$

The initial condition and transition parameter computation module 280 can compute the second slope (d) per equation (10) as follows:

$$d = -\frac{\omega_e \lambda_{d0}}{t_r}. \tag{10}$$

Referring again to FIG. 2A, the voltage command trajectory computation module 290 receives the first set of values 282, the second set of values 284, and set of discrete timer values ($t_0 \ldots t_1$) 291 as its inputs, and processes them to generate ramped voltage command signals (Vd, Vq) 292, 294. The number of the values in the set of discrete timer values ($t_0 \ldots t_1$) 291 varies depending on the rise time ($t_r$) 284, and can be generated by dividing the rise time ($t_r$) 284 into a number of discrete (e.g., evenly spaced) time increments that starts with $t_0$ and ends with $t_1$. In one embodiment, the number of discrete time increments is greater than two.

For example, based on the first offset value (a), the first slope (b), the rise time ($t_r$) and the set of discrete timer values ($t_0 \ldots t_1$) 291, the voltage command trajectory computation module 290 generates the ramped synchronous reference frame d-axis voltage command signal (Vd) 292. For example, in one embodiment, the voltage command trajectory computation module 290 computes the ramped synchronous reference frame d-axis voltage command signal (Vd) 292 per equation (11) as follows:

$$Vd^{} = Vd_0^{} + a + b(t-t_0) \tag{11},$$

where the value t is the present value of a timer that varies between the initial time ($t_0$) and the rise time ($t_r$). At the start of the transition, the value of t is equal to $t_0$.

Similarly, based on the second offset value (c), the second slope (d), the rise time ($t_r$) 284 and the set of discrete timer values ($t_0 \ldots t_1$) 291, the voltage command trajectory computation module 290 generates the ramped synchronous reference frame q-axis voltage command signal (Vq) 294. For example, in one embodiment, the voltage command trajectory computation module 290 computes the ramped synchronous reference frame q-axis voltage command signal (Vq) 294 per equation (12) as follows:

$$Vq^{} = Vq_0^{} + c + d(t-t_0) \tag{12}$$

Figure 4A:
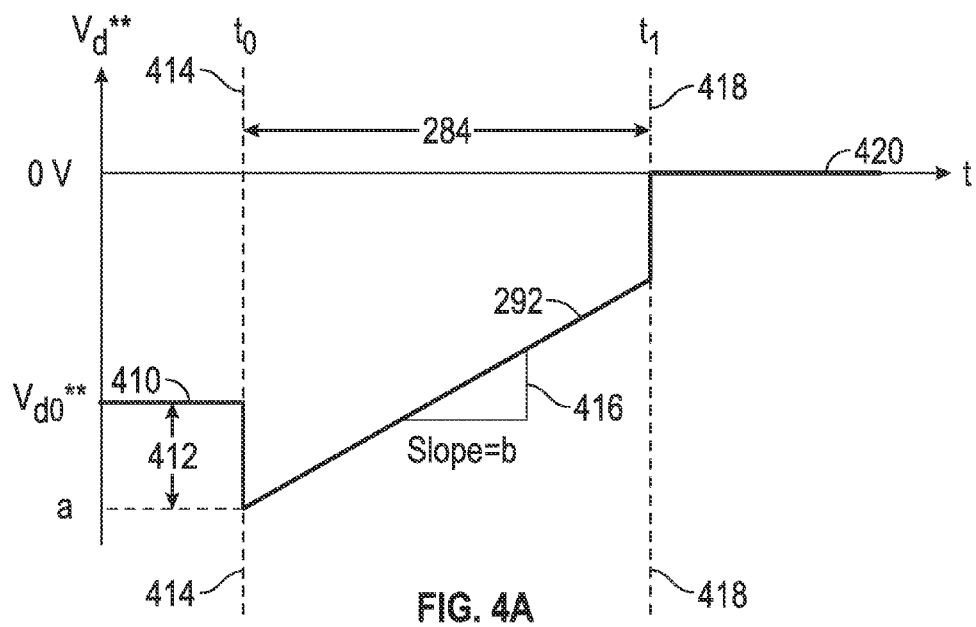
FIG. 4A is a graph of a ramped d-axis voltage command signal (Vd**).
Figure 4B:
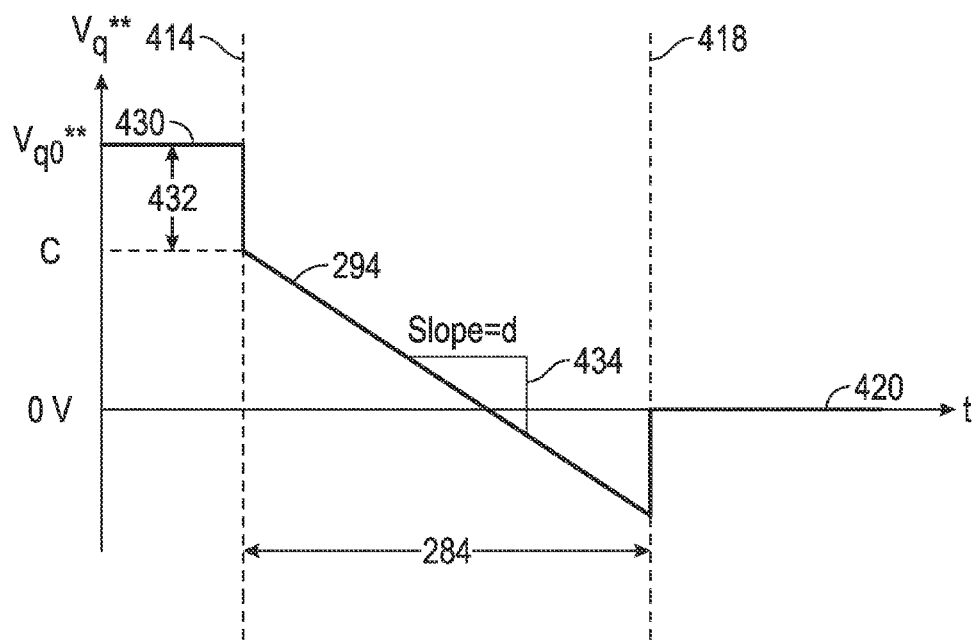
FIG. 4B is a graph of a ramped q-axis voltage command signal (Vq**).

Thus, for a transition from some initial operating condition to a three-phase short operating mode, the voltage command trajectory computation module 290 sets the ramped voltage command signals (Vd, Vq) 292, 294 to zero volts, as illustrated in FIGS. 4A and 4B, respectively. FIG. 4A is a graph of a ramped (synchronous reference frame) d-axis voltage command signal (Vd) 292, and FIG. 4B is a graph of a ramped (synchronous reference frame) q-axis voltage command signal (Vq) 294 that are generated by the ramped voltage command generator module 270 of FIG. 2A.

As illustrated in FIG. 4A, the ramped d-axis voltage command signal (Vd) 292 starts at an initial value (Vd$_0$) 410 that corresponds to the initial operating condition, and then drops by a first offset value (a) 412 at timer value (t$_0$) 414. The ramped d-axis voltage command signal (Vd) 292 then gradually increases during the rise time (t$_r$) 284 in accordance with first slope (b) defined by 416 as timer values increase until it reaches timer value (t$_1$) 418 at which point the ramped d-axis voltage command signal (Vd) 292 increases to zero volts at 420.

As illustrated in FIG. 4B, the ramped q-axis voltage command signal (Vq) 294 starts at an initial value (Vq$_0$) 430 that corresponds to the initial operating condition, and then drops by a second offset value (c) 432 at timer value (t$_0$) 414. The ramped q-axis voltage command signal (Vq) 294 then gradually decreases during the rise time (t$_r$) 284 in accordance with second slope (d) defined by 434 as timer values increase until it reaches timer value (t$_1$) 418 at which point the ramped q-axis voltage command signal (Vq) 294 increases to zero volts at 420.

Figure 5:
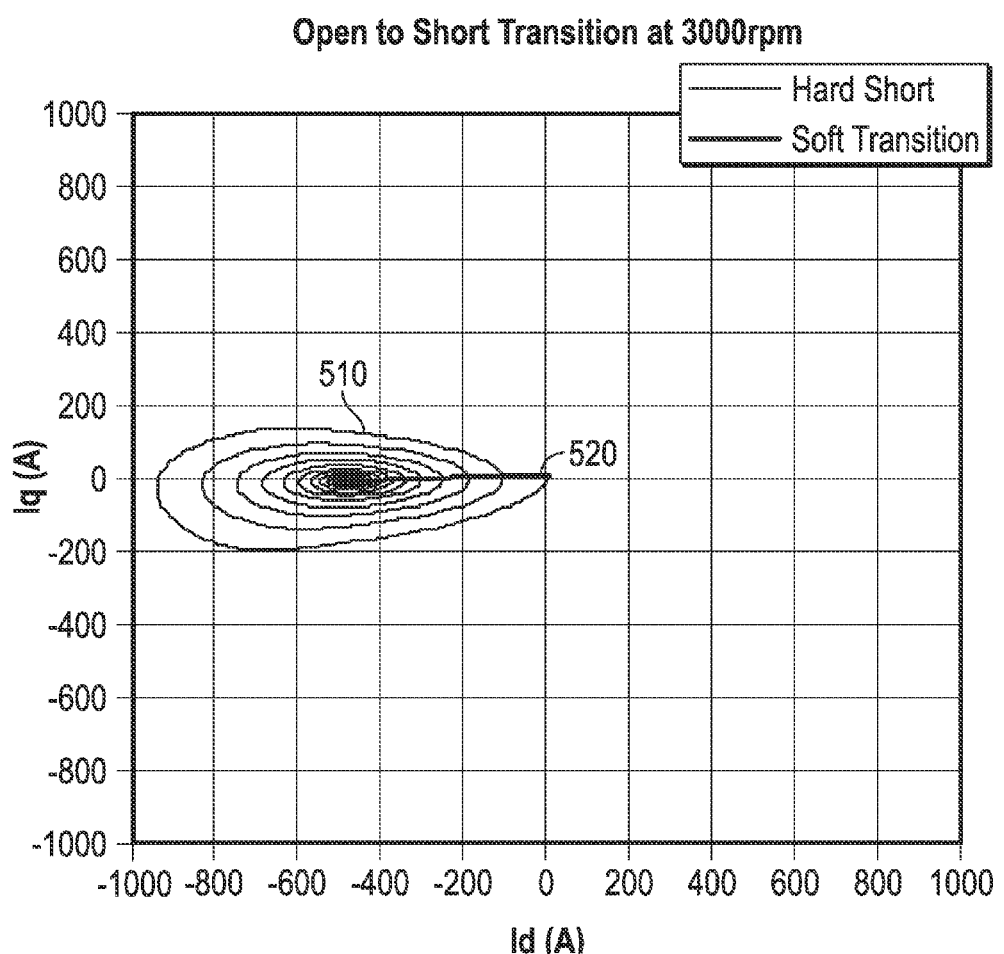
FIG. 5 shows two graphs that illustrate the dynamic responses of a machine due to an abrupt transition from a zero current initial condition to a three-phase short and during a ramped transition from a zero current initial condition to a three-phase short, respectively.

FIG. 5 shows two graphs 510, 520 that illustrate the dynamic responses of a machine due to an abrupt transition from a zero current initial condition to a three-phase short and during a ramped transition from a zero current initial condition to a three-phase short, respectively. The two graphs 510, 520 plot q-axis synchronous reference frame current (Iq) versus d-axis synchronous reference frame current (Id) on synchronous frame coordinates.

In particular, graph 510 illustrates q-axis synchronous reference frame current (Iq) as a function of d-axis synchronous reference frame current (Id) when a transition from a zero current initial condition to a three-phase short was applied instantly meaning that the standard voltage commands 172, 174 transition directly to zero. Graph 510 illustrates that application of the three-phase short in an abrupt manner results in very large current overshoot and a highly oscillatory response due to the lightly damped system poles. The current follows a very large and oscillatory dynamic trajectory, ultimately converging on the characteristic current. The final steady-state value is the characteristic current (approximately 475 Amperes peak). The peak negative D-axis current reaches approximately 2 times the final steady-state value. Not only do the currents have the oscillatory response, but the machine torque does as well. The huge peak overshoot on the current places large stresses on the machine and inverter. For many types of motors, this large negative D-axis current could demagnetize the rotor magnets and destroy the machine.

By contrast, graph 520 illustrates q-axis synchronous reference frame current (Iq) as a function of d-axis synchronous reference frame current (Id) when a three-phase short was applied using ramped voltage commands 292, 294. Graph 520 illustrates that using ramped voltage commands 292, 294 results in a very controlled trajectory of the phase current from zero to the final operating condition (characteristic current). This implementation of the disclosed embodiments minimizes oscillations in the stator current and motor torque, and reduces the peak overshoot of the negative D-axis current.

Figure 6A:
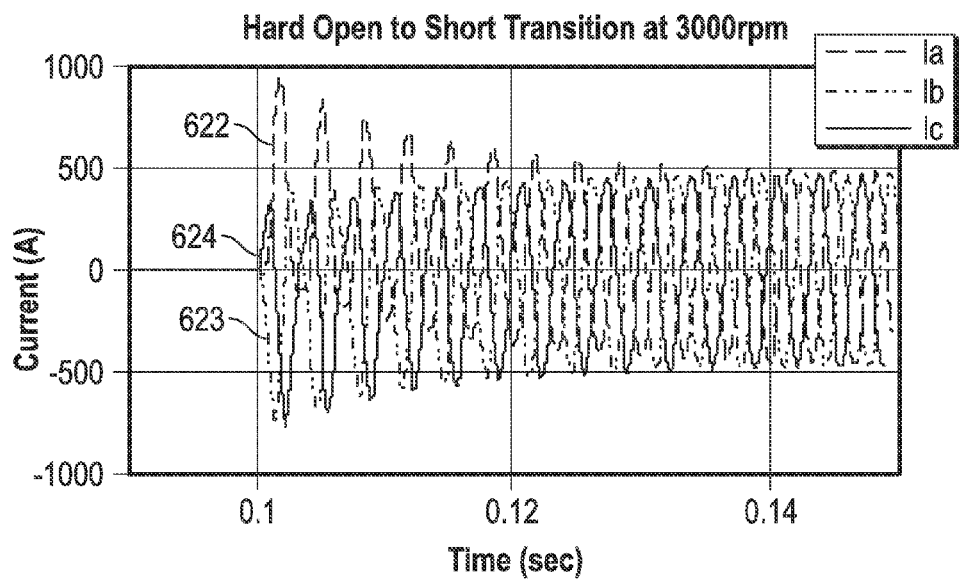
FIG. 6A is a set of graphs that illustrate stationary reference frame stator currents (Ia, Ib, Ic) as a function of time when a three-phase short was applied using standard voltage command signals.
Figure 6B:
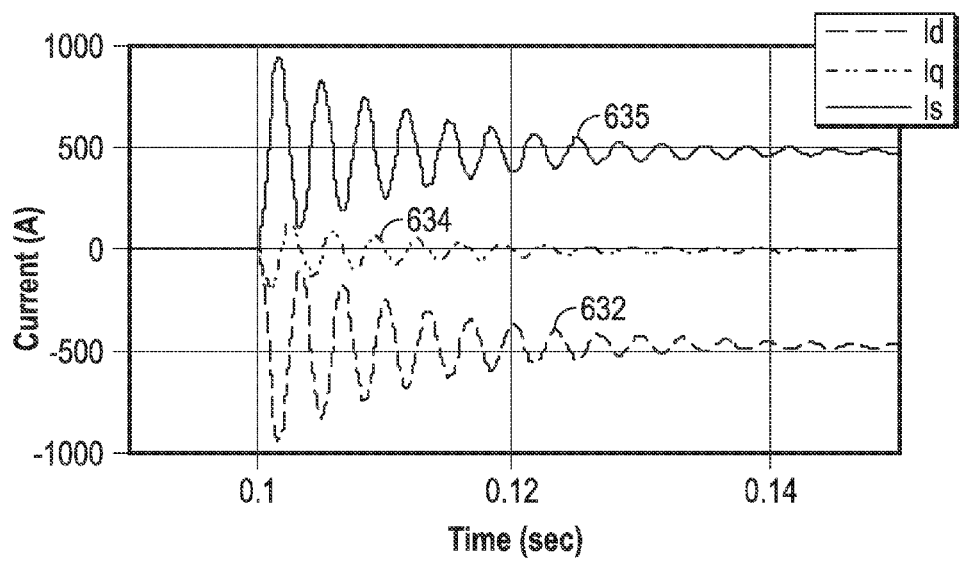
FIG. 6B is a set of graphs that illustrate synchronous reference frame currents (Id, Iq), and stationary frame current vector amplitude (Is) as a function of time when a three-phase short was applied using ramped voltage command signals.

FIG. 6A is a set of graphs that illustrate stationary reference frame stator currents (Ia, Ib, Ic) 622, 623, 624 as a function of time. FIG. 6B is a set of graphs that illustrate synchronous reference frame currents (Id, Iq) 632, 634, and stationary frame current vector amplitude (Is) 635 as a function of time. The various current waveforms in FIGS. 6A and 6B were generated using a simulator when a three-phase short was applied instantly meaning that the standard voltage commands 172, 174 transition directly to zero. FIGS. 6A and 6B illustrate that when an abrupt three-phase short is instantly applied to the machine and the standard voltage command signals 172, 174 transition directly to zero, the peak stationary phase current (Is) 635 (or d-axis current) reaches nearly 2× the characteristic current. As noted above, this can lead to demagnetization of the machine.

Figure 7A:
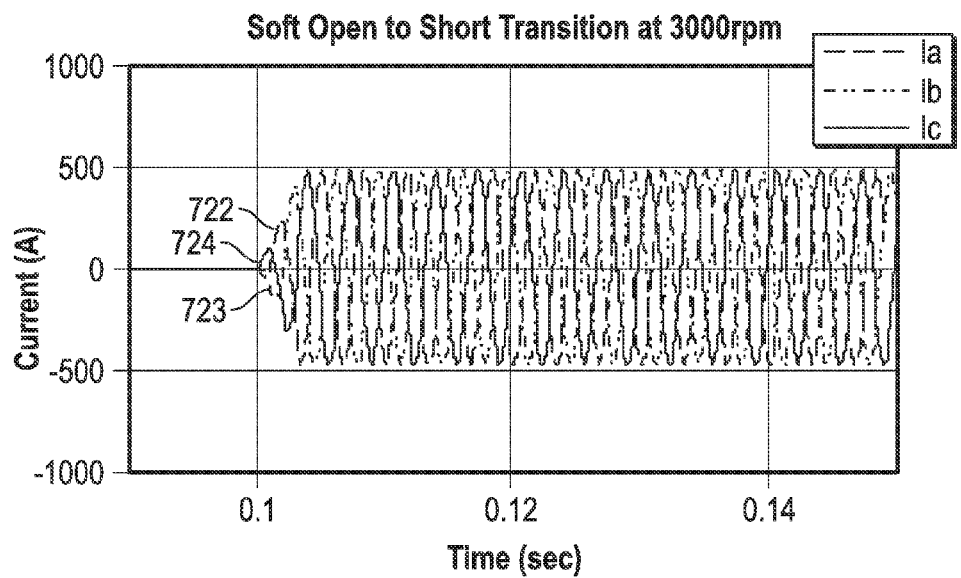
FIG. 7A is a set of graphs that illustrate stationary reference frame stator currents (Ia, Ib, Ic) as a function of time when a three-phase short was applied using ramped voltage command signals.
Figure 7B:
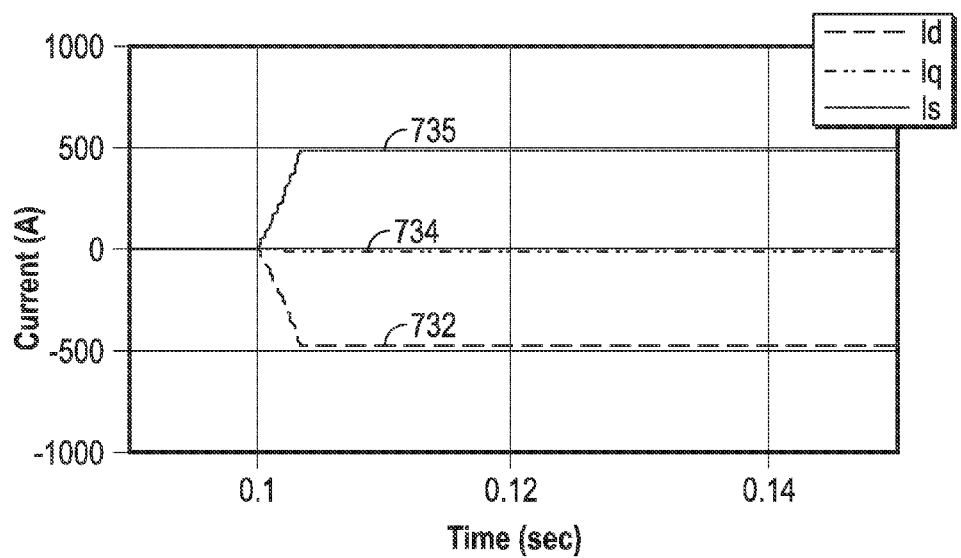
FIG. 7B is a set of graphs that illustrate synchronous reference frame currents (Id, Iq), and stationary phase current (Is) as a function of time when a three-phase short was applied using ramped voltage command signals.

FIG. 7A is a set of graphs that illustrate stationary reference frame stator currents (Ia, Ib, Ic) 722, 723, 724 as a function of time. FIG. 7B is a set of graphs that illustrate synchronous reference frame currents (Id, Iq) 732, 734, and stationary frame current vector amplitude (Is) 735 as a function of time. The various current waveforms in FIGS. 7A and 7B were generated using a simulator when a three-phase short was applied and ramped voltage commands 292, 294 were generated using a ramped voltage command generator module. FIGS. 7A and 7B illustrate that when ramped voltage commands 292, 294 are applied, under the same operating conditions as FIGS. 6A and 6B, there is virtually no overshoot, and the currents are very well behaved in comparison to when standard voltage command signals 172, 174 are applied.

Thus, the simulation results that are illustrated in FIGS. 5 through 7B, show that when ramped voltage commands 292, 294 are applied in this implementation of the disclosed embodiments, the peak transient current observed when transitioning to three-phase short operation can be significantly reduced. Further, this implementation of the disclosed embodiments can provide quick and controlled transition from any initial operating condition to three-phase short by eliminating the large overshoot in current which is experienced with the existing techniques.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A control system for generating voltage command signals for controlling a permanent magnet machine during a transition from an initial operating condition to a final operating condition, the control system comprising:
    a processor configured to execute software instructions; and
    a memory configured to store software instructions accessible by the processor, wherein the software instructions comprise:
    a voltage command generator module configured to generate ramped voltage command signals, based on an electrical angular frequency of the permanent magnet machine, and synchronous reference frame current signals, wherein the ramped voltage command signals each change linearly in accordance with a slope during a transition period that is set to a rise time, wherein the ramped voltage command signals are generated based on the rise time, offset values, and slopes that define trajectories of the ramped voltage command signals, wherein the ramped voltage command signals change from initial values at the initial operating condition by the offset values, then change linearly in accordance with the slopes during the transition period, and after the transition period, change by the offset values to final values at the final operating condition.

2. A system according to claim 1, wherein the rise time is equal to either:
    (1) a fundamental electrical period, which is the inverse of the electrical angular frequency, or
    (2) a maximum rise time if the fundamental electrical period is greater than the maximum rise time.

3. A system according to claim 1, wherein the ramped voltage command signals generated by the voltage command generator module comprise:
    a ramped d-axis voltage command signal that is generated based on the rise time, a first offset value, and a first slope, wherein the ramped d-axis voltage command signal changes from an initial value of the ramped d-axis voltage command signal at the initial operating condition by the first offset value, then changes linearly in accordance with the first slope during the transition period, and after the transition period changes by the first offset value to a final value of the ramped d-axis voltage command signal at the final operating condition; and
    a ramped q-axis voltage command signal that is generated based on the rise time, a second offset value, and a second slope, the rise time, and the set of discrete timer values, wherein the ramped q-axis voltage command signal changes from an initial value of the ramped q-axis voltage command signal at the initial operating condition by the second offset value, then changes linearly in accordance with the second slope during the transition period, and after the transition period changes by the second offset value to a final value of the ramped q-axis voltage command signal at the final operating condition.

4. A system according to claim 3, wherein the synchronous reference frame current signals comprise a d-axis current signal and a q-axis current signal, and wherein the voltage command generator module comprises:
    a ramped voltage command generator module, comprising:
        an initial condition and transition parameter computation module that is configured to generate, based on the electrical angular frequency, the d-axis current signal, and the q-axis current signal: the first offset value, the first slope, the second offset value, the second slope and the rise time.

5. A system according to claim 4, wherein the voltage command generator module further comprises:
a standard voltage command generator module that is configured to generate a standard d-axis voltage command signal and a standard q-axis voltage command signal based on a torque command signal, the electrical angular frequency, the DC input voltage, the d-axis current signal, and the q-axis current signal.

6. A system according to claim 5, further comprising:
a controller configured to generate a flag that is either:
disabled when the voltage command generator module is configured to operate in standard voltage command generation mode, or
enabled when the voltage command generator module is configured to operate in ramped voltage command generation mode; and
wherein the software instructions further comprise:
a selection module configured to select between the outputs generated by the standard voltage command generator module and the ramped voltage command generator module, wherein the selection module outputs either:
the standard d-axis voltage command signal and the standard q-axis voltage command signal when the flag is disabled; or
the ramped d-axis voltage command signal and the ramped q-axis voltage command signal when the flag is enabled.

7. A system according to claim 6, wherein the controller is configured to determine whether a transition from the initial operating condition to the final operating condition indicates that ramped voltage command generation mode is to be disabled or enabled.

8. A system according to claim 6, when the controller determines that the flag is to be enabled, wherein the initial condition and transition parameter computation module is configured to:
determine initial operating conditions of the permanent magnet machine comprising initial rotor fluxes and the electrical angular frequency;
compute the fundamental electrical period based on the electrical angular frequency, and set the rise time equal to either (1) the fundamental electrical period or (2) the maximum rise time if the fundamental electrical period is greater than the maximum rise time; and
compute, based on final rotor fluxes of the permanent magnet machine, the initial rotor fluxes and the electrical angular frequency, the first offset value, the first slope, the second offset value, and the second slope.

9. A system according to claim 8, wherein the initial condition and transition parameter computation module is configured to:
determine, based on the electrical angular frequency, the d-axis current signal and the q-axis current signal, initial operating conditions comprising: an initial value for the d-axis flux, an initial value for the q-axis flux, an initial value for the d-axis voltage command signal, and an initial value for the d-axis voltage command signal;
determine the rise time based on the electrical angular frequency;
generate a final value for a d-axis flux and a final value of the d-axis voltage command signal based on a final value of a d-axis current signal; and
generate a final value for a q-axis flux and a final value of the q-axis voltage command signal based on a final value of a q-axis current signal.

10. A system according to claim 9, wherein the initial condition and transition parameter computation module is configured to:
generate the first offset value by computing a difference between the final d-axis flux and the initial d-axis flux divided by the rise time;
generate the first slope by computing a difference between the final value of the d-axis voltage command signal and the initial value of d-axis voltage command signal and dividing by the rise time to generate the first slope;
generate the second offset value by computing a difference between a final q-axis flux and an initial q-axis flux divided by the rise time; and
generate the second slope by computing a difference between the final value of the q-axis voltage command signal and the initial value of q-axis voltage command signal and dividing by the rise time.

11. A system according to claim 10, wherein the voltage command trajectory computation module is further configured to perform processing events (1) through (5) as follows:
(1) upon receiving an indication the initial condition and transition parameter computation module, start a timer at a first value in a set of discrete timer values, set the ramped d-axis voltage command signal to a first value that corresponds to the initial operating condition and set the ramped q-axis voltage command signal to a second value that corresponds to the initial operating condition;
(2) change the first value by an increment to a first updated value corresponding to the first slope at a present value of the timer, and change the second value by an increment to a second updated value corresponding to the second slope at the present value of the timer, wherein the present value of the timer is a first value in the set of discrete timer values during the first iteration of processing event (2);
(3) determine whether the present value of the timer is less than the rise time;
(4) when the present value of the timer is determined to be greater than or equal to the rise time, set the ramped d-axis voltage command signal to a first final value that corresponds to a final operating condition, and set the ramped q-axis voltage command signal to a second final value that corresponds to the final operating condition; and
(5) when the present value of the timer is determined to be less than the rise time, change the timer to a new present value and repeat processing events (2) and (3), wherein the new present value is the next value in the set of discrete timer values.

12. A processor-readable storage medium having processor-readable code embodied thereon for programming at least one processor to perform a method for generating voltage command signals for controlling a permanent magnet machine during a transition from an initial operating condition to a final operating condition, the method comprising:
generating ramped voltage command signals, based on an electrical angular frequency of the permanent magnet machine, and synchronous reference frame current signals, wherein the ramped voltage command signals each change linearly in accordance with a slope during a transition period that is set to a rise time, wherein the ramped voltage command signals are generated based on the rise time, offset values, and slopes that define trajectories of the ramped voltage command signals, wherein the ramped voltage command signals change from initial values at the initial operating condition by the offset values, then change linearly in accordance with the slopes during the transition period, and after the transition period, change by the offset values to final values at the final operating condition.

13. A method according to claim 12, wherein the rise time is equal to either:
(1) a fundamental electrical period, which is the inverse of the electrical angular frequency, or
(2) a maximum rise time if the fundamental electrical period is greater than the maximum rise time.

14. A method according to claim 12, wherein the ramped voltage command signals comprise:
a ramped d-axis voltage command signal that is generated based on a first offset value, a first slope the rise time, and a set of discrete timer values, wherein the ramped d-axis voltage command signal changes from an initial value of the ramped d-axis voltage command signal at the initial operating condition by the first offset value, then changes linearly in accordance with the first slope during the transition period, and after the transition period changes by the first offset value to a final value of the ramped d-axis voltage command signal at the final operating condition; and
a ramped q-axis voltage command signal that is generated based on a second offset value, a second slope, the rise time, and the set of discrete timer values, wherein the ramped q-axis voltage command signal changes from an initial value of the ramped q-axis voltage command signal at the initial operating condition by the second offset value, then changes linearly in accordance with the second slope during the transition period, and after the transition period changes by the second offset value to a final value of the ramped q-axis voltage command signal at the final operating condition.

15. A method according to claim 14, wherein the synchronous reference frame current signals comprise a d-axis current signal and a q-axis current signal, and wherein generating comprises:
generating, based on the electrical angular frequency, the d-axis current signal, and the q-axis current signal: the first offset value, the first slope, the second offset value, the second slope and the rise time.

16. A method according to claim 15, further comprising:
generating a standard d-axis voltage command signal and a standard q-axis voltage command signal based on a torque command signal, the electrical angular frequency, the DC input voltage, the d-axis current signal, and the q-axis current signal;
generating a flag that is either: disabled when the voltage command generator module is configured to operate in standard voltage command generation mode, or enabled when the voltage command generator module is configured to operate in ramped voltage command generation mode; and
selecting and outputting either: the standard d-axis voltage command signal and the standard q-axis voltage command signal when the flag is disabled; or the ramped d-axis voltage command signal and the ramped q-axis voltage command signal when the flag is enabled.

17. A method according to claim 16, further comprising:
determining whether a transition from the initial operating condition to the final operating condition indicates that ramped voltage command generation mode is to be disabled or enabled;
when it is determined that the flag is to be enabled:
determining initial operating conditions of the permanent magnet machine comprising initial rotor fluxes and the electrical angular frequency;
computing the fundamental electrical period based on the electrical angular frequency, and set the rise time equal to either (1) the fundamental electrical period or (2) the maximum rise time if the fundamental electrical period is greater than the maximum rise time; and
computing, based on final rotor fluxes of the permanent magnet machine, the initial rotor fluxes and the electrical angular frequency, the first offset value, the first slope, the second offset value, and the second slope.

18. A method according to claim 17, wherein the initial condition and transition parameter computation module is configured to:
determining, based on the electrical angular frequency, the d-axis current signal and the q-axis current signal, initial operating conditions comprising: an initial value for the d-axis flux, an initial value for the q-axis flux, an initial value for the d-axis voltage command signal, and an initial value for the d-axis voltage command signal;
determining the rise time based on the electrical angular frequency;
generating a final value for a d-axis flux and a final value of the d-axis voltage command signal based on a final value of a d-axis current signal; and
generating a final value for a q-axis flux and a final value of the q-axis voltage command signal based on a final value of a q-axis current signal;
computing a difference between the final d-axis flux and the initial d-axis flux divided by the rise time to the first offset value;
computing a difference between the final value of the d-axis voltage command signal and the initial value of d-axis voltage command signal and dividing by the rise time to generate the first slope to generate the first slope;
computing a difference between a final q-axis flux and an initial q-axis flux divided by the rise time to generate the second offset value; and
computing a difference between the final value of the q-axis voltage command signal and the initial value of q-axis voltage command signal and dividing by the rise time to generate the second slope.

19. A method according to claim 18, further comprising the steps of:
(1) upon receiving an indication the initial condition and transition parameter computation module, starting a timer at a first value in a set of discrete timer values, setting the ramped d-axis voltage command signal to a first value that corresponds to the initial operating condition, and setting the ramped q-axis voltage command signal to a second value that corresponds to the initial operating condition;
(2) changing the first value by an increment to a first updated value corresponding to the first slope at a present value of the timer, and changing the second value by an increment to a second updated value corresponding to the second slope at the present value of the timer, wherein the present value of the timer is a first value in the set of discrete timer values during the first iteration of step (2);
(3) determining whether the present value of the timer is less than the rise time;
(4) when the present value of the timer is determined to be greater than or equal to the rise time, setting the ramped d-axis voltage command signal to a first final value that corresponds to a final operating condition, and setting the ramped q-axis voltage command signal to a second final value that corresponds to the final operating condition; and (5) when the present value of the timer is determined to be less than the rise time, changing the timer to a new present value, and repeating steps (2) and (3), wherein the new present value is the next value in the set of discrete timer values.

\* \* \* \* \*